Sept. 30, 1958  A. V. LORDO  2,853,779
TOOLS FOR EATING SPAGHETTI
Filed July 25, 1955
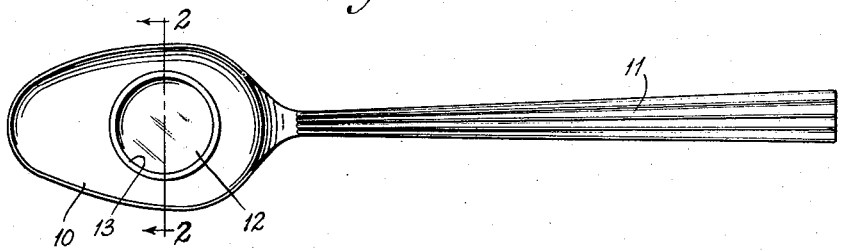
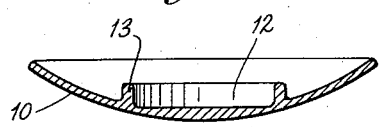
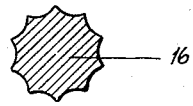
INVENTOR:
ALPHONSE V. LORDO,
BY Kingsland, Rogers & Ezell
ATTORNEYS

United States Patent Office 2,853,779
Patented Sept. 30, 1958

2,853,779
TOOLS FOR EATING SPAGHETTI

Alphonse V. Lordo, St. Louis, Mo., assignor to Lordo Products, Inc., a corporation of Missouri Application July 25, 1955, Serial No. 523,978

3 Claims. (Cl. 30—324)

The present invention relates to implements for use in eating spaghetti. Particularly, the invention includes a spoon having a bowl arranged to cooperate especially well with another implement for winding spaghetti onto that implement so that it may be more readily eaten in "Italian fashion."

It is a familiar practice in eating spaghetti to take a fork or the like and get a mass of spaghetti on it, then to place the end of the fork into the bowl of the spoon, such as a dessert spoon, and twist the fork until the spaghetti is tightly wound onto the fork without dangling ends. Then the spaghetti on the fork can be introduced into the mouth.

The present invention is designed to improve the implements so as to make them easier to use in wrapping the spaghetti tightly so that it can be eaten more readily.

In the drawings:

Figure 1 is a plan view of a spoon designed to be used in this connection;

Figure 2 is a sectional view taken on the line 2—2 of Figure 1, but enlarged;

Figure 3 is a plan view of a fork adapted to be used in the combination; and

Figure 4 is an enlarged section on the line 4—4 of Figure 3.

The spoon shown in Figure 1 is designed with a bowl 10 and a handle 11. Preferably it is the size of a dessert spoon, but that it not a necessity. The bowl 10 may be of conventional shape, save for the presence of a well or guide means 12 therein. The well 12 can be formed in any one of a number of ways, but in a preferred arrangement it is formed by providing an integral wall 13. This wall 13 is desirably substantially circular. In the illustration, the wall is upstanding from the base of the bowl of the spoon, but other configurations may be adopted provided there is the relatively deep well 12 with its inner walls fairly near vertical.

The fork is shown as having prongs 15 and a handle 16. The handle of the fork like the handle of the spoon, is desirably made with a fairly thick and rod-like section, as illustrated in Figure 4, and it is desirably fluted, as illustrated. The prongs 15 of the fork have a width slightly less than the size of the well 12.

In use, the operator can take an implement like the fork and take up on it a mass of spaghetti. He then places the guide well 12 of the spoon over the ends of the prongs 15 of the fork. He then takes the handle 16 of the fork between his fingers and turns it to wind the spaghetti tightly onto the prongs. The rod-like, preferably fluted section of the handle makes it easy to twist the handle between the fingers while the prong section 16 is securely guided by the wall 13 of the well 12.

As illustrated, the well 12 is a size slightly larger than the width of the prongs 15 of a standard fork, so that it may cooperate with them.

It will be seen that the invention accomplishes the result of making it easier to eat spaghetti.

What is claimed is:

1. An implement for use in eating spaghetti or the like, including a spoon-shaped element having a handle, and an ordinarily hollow bowl-portion, the bowl portion having a well therein of generally circular shape with steep walls and a substantially flat bottom, so that it may guide another implement in winding spaghetti on such other implement, the walls of the bowl-portion curving upwardly and outwardly from the steeper walls of the well, and the periphery of the well being encompassed within and spaced inwardly of the upper edges of the walls of the bowl-portion.

2. The combination of claim 1, wherein the well is formed by a wall rising substantially vertically from the bowl portion at the middle thereof and within the normal walls of the bowl portion, the well having a size to accommodate the tine end of a conventional table fork.

3. An implement for cooperating with a fork in gathering spaghetti or the like for being eaten, comprising: a bowl-portion; and guide means in the bowl-portion to receive the fork and guide the same while it is being twisted in the bowl-portion, the guide means being a generally circular wall steeper than the walls of the bowl-portion, providing a well within the bowl-portion that is substantially the size of the tine end of the fork, the walls of the bowl-portion curving upwardly and outwardly from the steeper walls of the well, and the periphery of the well being encompassed within and spaced inwardly of the upper edges of the walls of the bowl-portion.

References Cited in the file of this patent

UNITED STATES PATENTS

| | | |
|---|---|---|
| D. 28,155 | Wallace | Jan. 11, 1898 |
| 853,751 | Attanasio | May 14, 1907 |
| 911,873 | Handel | Feb. 9, 1909 |
| 2,130,661 | Zaebst | Sept. 20, 1938 |
| 2,249,551 | Zohe | July 15, 1941 |